(No Model.)
W. E. CASE.
APPARATUS FOR CONVERTING HEAT ENERGY INTO ELECTRICAL ENERGY.
No. 344,345. Patented June 29, 1886.
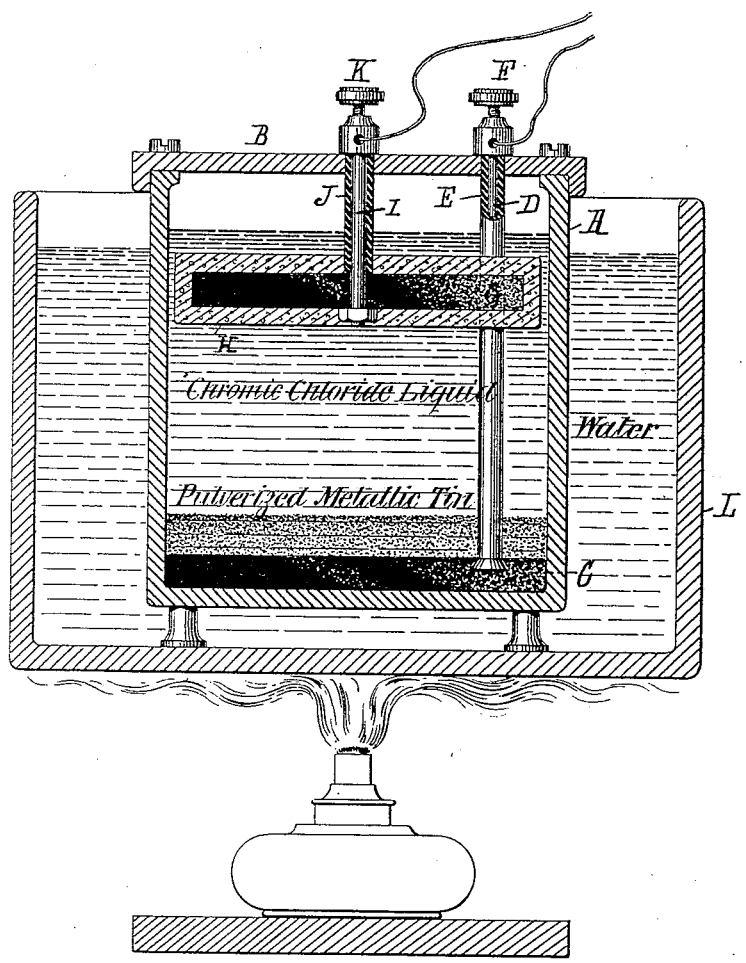
WITNESSES
INVENTOR
Willard E. Case
by Park Benjamin
Attorney

UNITED STATES PATENT OFFICE.

WILLARD E. CASE, OF AUBURN, NEW YORK.

APPARATUS FOR CONVERTING HEAT ENERGY INTO ELECTRICAL ENERGY.

SPECIFICATION forming part of Letters Patent No. 344,345, dated June 29, 1886.

Application filed October 26, 1885. Serial No. 180,961. (No model.)

*To all whom it may concern:*

Be it known that I, WILLARD E. CASE, of Auburn, Cayuga county, New York, have invented a new and useful Improvement in Apparatus for Converting Heat Energy into Electrical Energy, of which the following is a specification.

My invention relates to an apparatus for the direct conversion of heat energy into electrical energy. Hitherto this has been chiefly accomplished by means of the thermopile, and through the consumption of fuel to generate steam or other prime motor, which in turn actuates an engine which drives a dynamo.

A thermopile converts heat energy into electrical energy without the intermediate development of chemical energy. The boiler, engine, and dynamo convert heat energy into electrical energy through the intermediate development of mechanical energy.

My apparatus differs in principle from both of the foregoing in that it converts heat energy into electrical energy through the intermediate development of chemical energy. So, also, my apparatus differs in principle from a galvanic cell, which converts chemical energy into electrical energy, the chemical energy, in the case of the galvanic cell, being the result of the simple placing of the ingredients of the cell in proximity, so that their affinities are free to act.

In my apparatus, despite the formation of a circuit and the placing together of the ingredients, (this being a proceeding which in the galvanic battery results in an electrical current being immediately developed,) no chemical reaction occurs and no current is produced; but when heat is applied, and not until then, chemical energy is developed in the apparatus and the electrical current is generated; hence the chemical energy engendered corresponds and is correlated to the heat energy supplied, and the electrical energy, depending on the chemical energy, through that medium is in like manner (necessary losses incident always to transformation of one form of energy to another being neglected) correspondent and correlative.

In order to maintain the development of chemical energy, the supply of heat energy must be maintained; but the limit of development of chemical energy is found when the affinities of the elements rendered free to react by the heat are satisfied. Then the apparatus becomes inert and substantially in like condition to that of a galvanic cell (a zinc-carbon dilute sulphuric-acid cell, for instance) when all the zinc has been converted into sulphate. When my apparatus has reached this stage, I have discovered that I can regenerate it and bring it back to its original potential state simply by abstracting heat beyond a certain limit. The ingredients on cooling develop new affinities, and the consequence is a reaction, which brings the apparatus back to its original state—that is, so that the renewed application of heat will again raise it from the potential to the kinetic state, causing a new development of chemical energy, and consequently of electrical energy, as in the beginning. It will be seen therefore that in my apparatus there is substantially no expenditure of material, and that, in fact, it is a heat-engine operating, by reason of the heat supplied to it, to yield an electric current until the chemical affinities of its ingredients set free to act by the heat are satisfied, and then by the abstraction of heat being caused to return to its original condition, ready to become again operative to yield a current by the renewed application of heat.

The best means which I now know of practically making my apparatus is as follows:

Referring to the accompanying drawing, which is a sectional view of my apparatus, A is a containing-vessel, which is closed hermetically by the cover B.

C is a plate, preferably of carbon, which rests upon the bottom of the vessel A. Connected with this plate is a rod, D, of conducting material, which is covered with rubber or other suitable insulating substance, E. This rod extends through the cover B and communicates with a binding-screw, F, to which one of the circuit-wires is attached. Upon said plate C, I place a quantity of pulverized metallic tin. Said tin being in contact with plate C makes electrical connection with it.

G is a plate of carbon, which is surrounded with an envelope, H, of porous non-conducting material, such as baked porous clay or pottery.

Connected to the plate G is a rod, I, of conducting material, surrounded with insulating material J above said plate. The rod I passes through the cover B, and to it is connected the binding-screw K, to which the other circuit-wire is connected.

In the vessel A, and surrounding the plates therein, I place a solution of chromic chloride. This solution I prepare according to a known process of heating together chromic acid, hydrochloric acid, and alcohol.

My apparatus thus constructed at normal temperature gives substantially no electrical current—that is, if it yields any current at all the same is very small, and is probably unavoidably due to impurities in the tin or liquid. With chemically-pure materials it should, however, yield no current at all. On applying heat to the containing-vessel and so raising the temperature of the liquid a current becomes manifest, and as the result of experiment I have found that the galvanometer indications obtained are approximately as follows: On heating the cell to 120° Fahrenheit the galvanometer deflection is two degrees. The following table shows the deflections as the heat augments: 130° Fahrenheit, four degrees; 140° Fahrenheit, eight degrees; 150° Fahrenheit, thirteen degrees; 160° Fahrenheit, seventeen degrees; 170° Fahrenheit, twenty-nine degrees; 180° Fahrenheit, twenty-eight degrees; 190° Fahrenheit, thirty-four degrees; 200° Fahrenheit, forty-four degrees; 207° Fahrenheit, forty-nine degrees. The elevation of temperature should, however, not be carried above 212° Fahrenheit, the maximum deflection being obtained at about 207°.

I do not mean to limit myself to an apparatus yielding exactly the foregoing deflections corresponding to the above-mentioned degrees of heat, because these may vary somewhat, depending on the character of the materials used; but in general it may be taken as fixed that the temperature should not exceed 212°, and that within some fifteen degrees below this the maximum strength of current is obtained.

In order to prevent the heat exceeding 212° Fahrenheit, I prefer to adopt the arrangement of heating device shown in the drawing. This consists simply in an open tank, L, containing water, in which the vessel A is placed. Beneath the tank I place any convenient source of heat, such as a lamp, as shown. The tank being open to the atmosphere, the water remains at the normal boiling-point, which, under ordinary conditions, as well known, is about 212° Fahrenheit. In this way I prevent overheating of the apparatus.

I have already stated that in my apparatus the heat energy supplied is directly converted into chemical energy. The immediate effect of the elevation of temperature, so far as I am able to recognize the same, is to decompose the chromic chloride in the presence of the tin into free chlorine and chromium protochloride. The chlorine then combines with the pulverized metallic tin to form tin protochloride, and as a consequence of this reaction an electrical current is established through the liquid and between the metallic tin as one electrode and the carbon plate G as the other electrode. The carbon plate C is not itself an electrode, but serves simply as a conductor in contact with the tin to lead the current to the circuit terminal. The heat being maintained, the current continues to flow until all the tin is converted into protochloride. The apparatus is then spent or exhausted, all chemical affinities rendered active by the application of heat being satisfied. I may now regenerate the apparatus from its present inert state simply by abstracting heat. This I do by removing the lamp or other source of heat, and in addition, if desired, taking the vessel A out of the hot water and placing it in a cooling medium. As the liquid cools, the tin protochloride and chromium protochloride react. The chlorine from the tin protochloride goes over to the chromium protochloride, forming chromic chloride, and metallic tin is deposited. This tin falls by gravity upon the carbon plate C, and by the time the liquid has been cooled down to normal temperature the condition of the apparatus is the same as it was in the beginning, so that it is simply necessary again to apply heat to cause a current to be generated. The object of the porous non-conducting envelope around the carbon plate G is only to prevent any possible deposition of tin thereon. I do not limit myself to this particular device for the purpose, because others may be employed.

In lieu of placing the tin on the apparatus in a comminuted state I may insert it in a solid state. The reactions will be the same as already described, and when the apparatus is regenerated the tin will be deposited in pulverulent form. So, also, instead of directly putting in metallic tin, I may form the liquid of tin protochloride and chromium protochloride, which immediately on mingling at normal temperature will deposit the tin, and the remaining liquid will be chromic chloride.

It will be apparent from the foregoing that it is not necessary, in order to maintain the apparatus in efficiency as a producer of electricity, to replenish the contents thereof, but that all that is required is to heat the apparatus, as above described, to cause it to yield a current, then when the current ceases to cool it, and then to reapply the heat, and so on indefinitely.

In another application of Letters Patent filed simultaneously herewith, and serially numbered 180,963, I have described and claimed the improvement in the art of converting heat energy into electrical energy, and in still another application for Letters Patent, also filed simultaneously herewith, and serially numbered 180,962, I have described and claimed the process of regenerating exhausted galvanic cells, all substantially as herein set forth.

The subject-matter of the aforesaid applications is herein disclaimed.

I have stated that the containing-vessel A is provided with a cover, B, whereby it is hermetically closed. This hermetical sealing of the vessel A is not essential, inasmuch as the apparatus will operate when the vessel A is open to the atmosphere; but it is decidedly preferable to seal said vessel, because in time the oxygen of the air will act on the solution to decompose it, thus impairing the efficiency of the device.

I have practically operated the apparatus herein described for the generation of an electric current, with which current I have deposited metal and actuated electric bells and other electrical apparatus.

I claim as my invention—

1. An apparatus for converting heat energy into electrical energy, containing the combination of a vessel, two bodies of conducting material, and a liquid, the said bodies and liquid being in said vessel, and a means of heating said liquid, the said liquid at normal temperature being substantially without chemical action upon either of said bodies, but when heated capable of chemically reacting on one of said bodies, and so generating an electrical current in a circuit including said bodies and liquid, substantially as described.

2. An apparatus for converting heat energy into electrical energy, containing the combination of a hermetically-closed vessel, two bodies of conducting material, and a liquid, the said liquid and bodies being in said vessel, and a means of heating said liquid, the said liquid at normal temperature being substantially without chemical action upon either of said bodies, but when heated capable of chemically reacting on one of said bodies, and so generating an electrical current in a circuit including said bodies and liquid, substantially as described.

3. An apparatus for converting heat energy into electrical energy, containing the combination of a vessel, a solid body of conducting material, a body of conducting material in comminuted form, and a liquid, the said bodies and liquid being in said vessel, and a means of heating said liquid, the said liquid at normal temperature being substantially without chemical action on either of said bodies, but which liquid on being heated chemically reacts on said comminuted body, so generating an electrical current in a circuit including said bodies and liquid, substantially as described.

4. An apparatus for converting heat energy into electrical energy, containing the combination of a vessel, a solid body of conducting material, a body of conducting material in comminuted form, a body of conducting material in electrical contact with said comminuted body and with one circuit terminal, and a liquid, the said bodies and liquid being in said vessel, and a means of heating said liquid, the said liquid at normal temperature being substantially without action on said bodies, but which liquid on being heated chemically reacts on said comminuted body, so generating an electrical current in a circuit including said bodies and liquid, substantially as described.

5. An apparatus for converting heat energy into electrical energy, containing the combination of a vessel, a solid body of conducting material, a body of conducting material in comminuted form, a means (such as a porous partition of non-conducting material) for preventing contact between said bodies and a liquid, the said bodies and liquid being in said vessel, and a means of heating said liquid, the said liquid at normal temperature being substantially without chemical action on either of said bodies, but which liquid on being heated chemically reacts on said comminuted body, so generating an electrical current in a circuit including said bodies and liquid, substantially as described.

6. In an apparatus for converting heat energy into electrical energy, the combination of a vessel, A, carbon body G, plate C, of conducting material, a mass of pulverized metallic tin in contact with said plate, circuit-connections, and a liquid consisting of a solution of chromic chloride, the said liquid, carbons, and tin being contained in said vessel, and a means of heating said liquid, substantially as described.

7. In an apparatus for converting heat energy into electrical energy, the combination of a vessel, A, carbon plate G, having a porous envelope, H, carbon plate C, a mass of pulverized metallic tin in contact with said plate, circuit-connections, and a liquid consisting of a solution of chromic chloride, the said liquid, carbons, and tin being contained in said vessel, and a means of heating said liquid, substantially as described.

8. In combination with an apparatus for converting heat energy into chemical and electrical energy, substantially such as herein described, a receptacle adapted to receive said apparatus, containing a substance having a boiling-point not exceeding 212° Farenheit, (under ordinary conditions,) and a means of heating said substance, substantially as set forth.

9. In combination with an apparatus for converting heat energy into chemical and electrical energy, substantially as herein described, an open receptacle adapted to receive said apparatus and containing water, and a means of heating said water, substantially as set forth.

WILLARD E. CASE.

Witnesses:
PARK BENJAMIN,
W. E. DORAN.